United States Patent
Bühle et al.

(10) Patent No.: US 10,703,191 B2
(45) Date of Patent: Jul. 7, 2020

(54) METHOD FOR OPERATING A VEHICLE DRIVETRAIN, AND DRIVETRAIN MODULE FOR SUCH A VEHICLE

(71) Applicant: ZF Friedrichshafen AG, Friedrichshafen (DE)

(72) Inventors: Felix Bühle, Eriskirch (DE); Christoph Hess, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/196,594

(22) Filed: Nov. 20, 2018

(65) Prior Publication Data

US 2019/0152310 A1 May 23, 2019

(30) Foreign Application Priority Data

Nov. 21, 2017 (DE) .......................... 10 2017 220 776

(51) Int. Cl.
*B60W 10/02* (2006.01)
*B60K 6/485* (2007.10)
*B60W 10/06* (2006.01)
*B60W 10/08* (2006.01)
(Continued)

(52) U.S. Cl.
CPC ............. *B60K 6/485* (2013.01); *B60W 10/02* (2013.01); *B60W 10/06* (2013.01); *B60W 10/08* (2013.01); *B60W 20/20* (2013.01); *B60W 20/40* (2013.01); *B60L 2240/421* (2013.01); *B60L 2240/486* (2013.01); *B60W 2510/0241* (2013.01);
(Continued)

(58) Field of Classification Search
CPC .. B60K 6/485; B60K 2006/268; B60K 6/387; B60K 6/547; B60K 2006/4825; B60K 6/48; B60W 10/02; B60W 10/06; B60W 10/08; B60W 20/20; B60W 20/40; B60W 2510/0241; B60W 2710/025; B60W 2710/081; B60W 2710/105; B60W 2050/0012; B60W 30/18027; B60W 10/026; B60W 20/15; B60W 50/0098; B60L 2240/421; B60L 2240/486
See application file for complete search history.

(56) References Cited

U.S. PATENT DOCUMENTS 7,744,502 B2 6/2010 Dreibholz et al.
2016/0123292 A1* 5/2016 Wright ................ F02N 11/0855
290/38 C
2016/0304075 A1* 10/2016 Gibson ................. B60W 20/00
(Continued)

FOREIGN PATENT DOCUMENTS

DE 102006018058 A1 11/2007
DE 102016206742 A1 10/2017

*Primary Examiner* — David J Hlavka
(74) *Attorney, Agent, or Firm* — Dority & Manning, P.A.

(57) ABSTRACT

A method for operating a drive train of a motor vehicle includes, for a starting process according to a first operating strategy, completely engaging a torque converter lockup clutch (WK) and, according to a second operating strategy, not completely engaging the torque converter lockup clutch (WK). A hydraulic pressure gradient for filling a piston chamber of the torque converter lockup clutch (WK) is selected to be higher upon selection of the first operating strategy than upon selection of the second operating strategy. A drive train module of a motor vehicle includes a control unit (5) for controlling, by way of an open-loop control system, the method.

5 Claims, 2 Drawing Sheets

(51) Int. Cl.
*B60W 20/20* (2016.01)
*B60W 20/40* (2016.01)

(52) U.S. Cl.
CPC . *B60W 2710/025* (2013.01); *B60W 2710/081* (2013.01); *B60W 2710/105* (2013.01)

(56) References Cited

U.S. PATENT DOCUMENTS

2017/0066447 A1\* 3/2017 Hertel ............. B60W 30/18172
2018/0208179 A1\* 7/2018 Johri ........................ B60K 6/48
2018/0304733 A1\* 10/2018 Katsura ................. B60W 20/10

\* cited by examiner

METHOD FOR OPERATING A VEHICLE DRIVETRAIN, AND DRIVETRAIN MODULE FOR SUCH A VEHICLE

FIELD OF THE INVENTION

The invention relates generally to a method for operating a drive train of a motor vehicle, and to a drive train module of such a motor vehicle.

BACKGROUND

The drive train of a conventional motor vehicle with an internal combustion engine as the sole drive source usually includes a starting component in the power flow between the drive source and the driving wheels in order to enable a starting process of the motor vehicle. One example of such a starting component is a hydrodynamic torque converter. The drive train of a motor vehicle with an electric motor as the sole drive source generally does not require a starting component, since the electric motor can accelerate the vehicle from a standstill.

The drive train of a parallel hybrid vehicle usually requires a starting component, provided a starting process is to take place also solely with the aid of the internal combustion engine. Different variants of the electric starting operation of a motor vehicle with a parallel hybrid drive train are known from the related art. Patent application DE 10 2006 018 058 A1 discloses different types of starting processes for a motor vehicle comprising a parallel hybrid drive train. Represented in FIG. 4 are time sequences during a purely electrically driven starting process with a torque converter lockup clutch in slip operation, and in FIG. 5 with an engaged torque converter lockup clutch.

Patent application DE 10 2016 206 742 A1 describes a method for selecting between a starting process of a motor vehicle with a parallel hybrid drive train with a slipping or a locked-up starting component depending on transmission-external parameters, and with a subsequent appropriate control of the torque converter lockup clutch.

SUMMARY OF THE INVENTION

Example aspects of the invention improve the reliability of the starting process with a locked-up starting component.

The method according to example aspects of the present invention is suitable for operating a motor vehicle drive train which includes at least one drive source designed as an electric machine, a transmission for providing different transmission ratios between an input shaft and an output shaft of the transmission, and a hydrodynamic torque converter in the power flow between the drive source and the output shaft. The torque converter includes at least one impeller and one turbine wheel, which are hydrodynamically operatively connected to each other. The torque converter can additionally include a stator. The electric machine is operable either as the sole drive source in the drive train or with an internal combustion engine in a hybrid drive train. The torque converter can be arranged outside or inside a housing of the transmission, and is configured to be locked up by engaging a hydraulically actuatable torque converter lockup clutch. By engaging the torque converter lockup clutch, the impeller and the turbine wheel of the torque converter are connected to each other in a friction-locking manner.

For a starting process of the motor vehicle, a selection is made between a first and a second operating strategy for controlling the torque converter lockup clutch. In the first operating strategy, the torque converter lockup clutch is completely engaged, provided it has not already been completely engaged. In the completely engaged condition of the torque converter lockup clutch, essentially no differential speed occurs between the impeller and the turbine wheel of the torque converter. However, a so-called micro-slip between the impeller and the turbine wheel can occur in the completely engaged condition of the torque converter lockup clutch. In the second operating strategy, the torque converter lockup clutch is not completely engaged, and so the torque converter assumes a slip state during the starting process. A slip state is understood to be, in this case, a condition of the torque converter, in which a differential speed occurs between the impeller and the turbine wheel.

Upon selection of the first operating strategy, according to example aspects of the invention, a hydraulic pressure gradient for filling a piston chamber of the torque converter lockup clutch is selected to be higher than upon selection of the second operating strategy. This differentiation is based on the finding that the torque converter has no rotational speed or only a very low rotational speed immediately before a starting process according to the first operating strategy. A very low rotational speed is understood to be, by way of example, a rotational speed of less than eighty revolutions per minute (80 rpm). Therefore, a comparatively rapid engagement process of the torque converter lockup clutch cannot result in an excitation of a torsional vibration in the drive train. Immediately before a starting process according to the second operating strategy, on the other hand, the impeller can have a higher rotational speed, either intentionally or unintentionally. In such an operating condition of the torque converter, a comparatively slower filling of the piston chamber of the torque converter lockup clutch is advisable, in order to prevent a considerable excitation of torsional vibration.

Due to the comparatively rapid engagement process of the torque converter lockup clutch upon selection of the first operating strategy, a readiness for the starting process is achieved faster. As a result, the starting process can be reliably carried out with the torque converter lockup clutch engaged.

In the case of a starting process according to the second operating strategy as well, the torque converter lockup clutch can already transmit torque. In other words, the torque converter lockup clutch does not need to be completely disengaged in a starting process according to the second operating strategy. As a result, a comfortable, complete engagement of the torque converter lockup clutch subsequent to the starting process is facilitated.

The supply of hydraulic fluid to the piston chamber of the torque converter lockup clutch actuation is controlled with the aid of a hydraulic system which can be a component of the transmission. For this purpose, the hydraulic system includes at least one pump which supplies a pressure circuit of the hydraulic system with a system pressure. The system pressure is adjustable by controlling the pump and/or with the aid of a valve of the hydraulic system. Preferably, the system pressure is increased when the first operating strategy is selected for the starting operation of the motor vehicle. As a result, the engagement process of the torque converter lockup clutch can be further accelerated, and so the readiness for the starting process is achieved faster. According to one particularly preferred embodiment, the system pressure can be raised to a maximum possible value upon selection of the first operating strategy.

The engagement process of a hydraulically actuated shift element, such as the torque converter lockup clutch, is characterized by a pre-filling phase, a filling equalization phase, and a closing phase. In the pre-filling phase, the piston chamber of the torque converter lockup clutch is filled with hydraulic fluid. In the filling equalization phase, the filling of the piston chamber is slowed down, in order to ensure that the piston chamber is uniformly filled with hydraulic fluid before the beginning of the closing phase. The pre-filling phase and the filling equalization phase are preferably timed. At the end of the filling equalization phase, the shift element transfers no torque or only a small amount of torque. In the closing phase, the pressure in the piston chamber is increased, and so the torque transmitted by the shift element is increased. Preferably, a filling equalization time of the torque converter lockup clutch, i.e., the time predefined for the filling equalization phase, is selected to be shorter upon selection of the first operating strategy than upon selection of the second operating strategy. As a result, the engagement process of the torque converter lockup clutch can be further accelerated, and so the readiness for the starting process is achieved faster.

In addition to the method according to example aspects of the invention, a drive train module of a motor vehicle is also described, which includes at least one drive source designed as an electric machine, an interface to an internal combustion engine of the motor vehicle, a control unit, a transmission for providing different transmission ratios between an input shaft and an output shaft of the transmission, and a hydrodynamic torque converter in the power flow between the drive source and the output shaft. In this case, the control unit is configured for controlling or implementing the above-described method.

BRIEF DESCRIPTION OF THE DRAWINGS

One exemplary embodiment is described in detail in the following with reference to the attached figures. Wherein.

DETAILED DESCRIPTION

Figure 1:
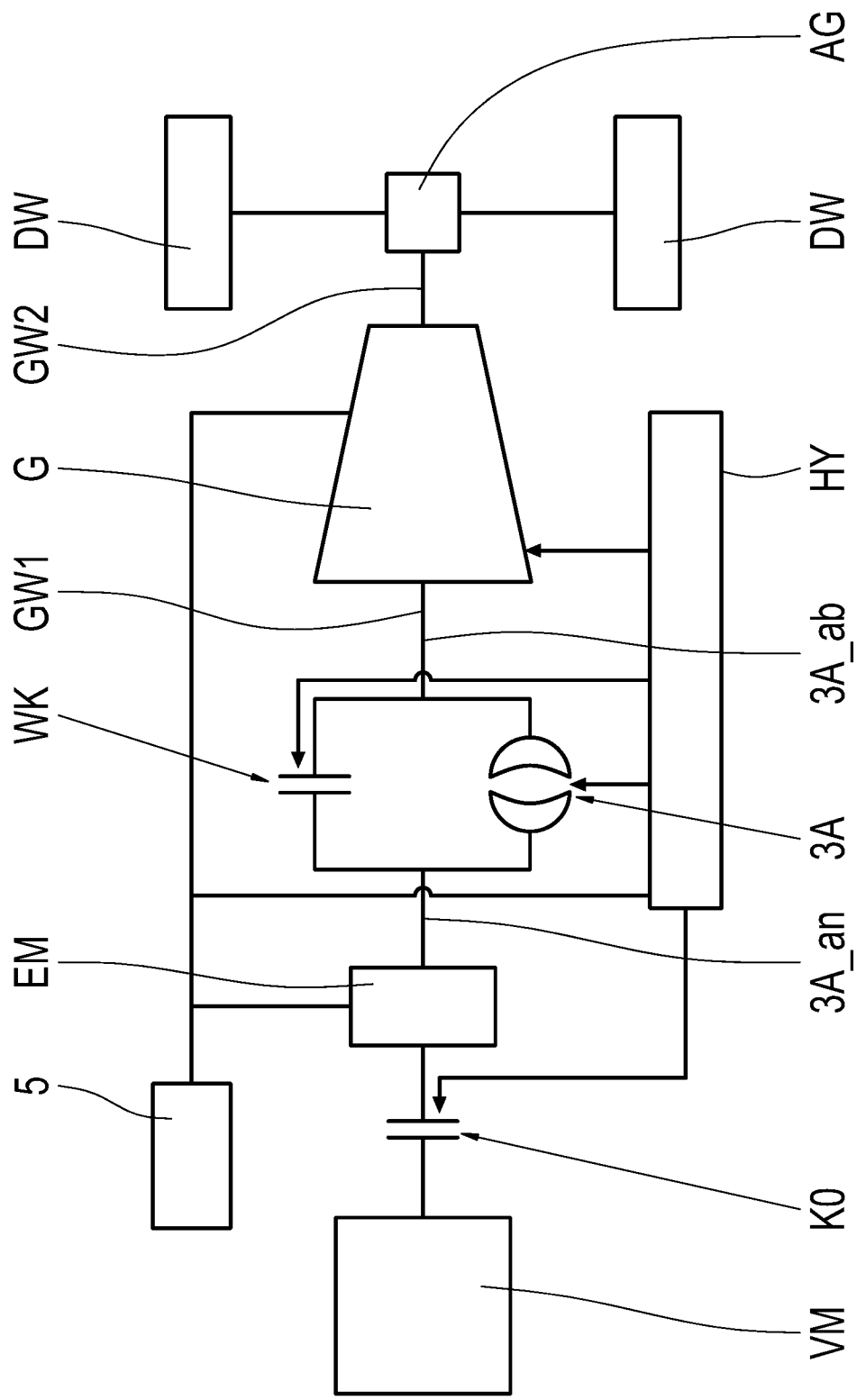
FIG. 1 shows a motor vehicle drive train including a hydrodynamic torque converter as the starting component.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of a drive train of a motor vehicle designed as a parallel hybrid drive train. The drive train includes an internal combustion engine VM and an electric machine EM as drive units. A separating clutch K0 is connected between the internal combustion engine VM and the electric machine EM. The drive train from FIG. 1 further includes, as a component, a transmission G for providing various transmission ratios between an input shaft GW1 and an output shaft GW2 of the transmission G, as well as a starting component 3A which is designed as a hydrodynamic torque converter. The starting component 3A is functionally arranged between the drive units VM, EM and the transmission G. The starting component 3A can be arranged together with the transmission G, the electric machine EM, and the separating clutch K0 in a shared housing. An input side 3A_an and an output side 3A_ab of the starting component 3A can be fixedly connected to each other by engaging a hydraulically actuatable torque converter lockup clutch WK. The transmission G is arranged between the starting component 3A and a differential gear AG, via which the power present at the output shaft GW2 is distributed to driving wheels DW of the motor vehicle. A hydraulic system HY is associated with the transmission G, the starting component 3A, a piston chamber (not represented) for actuating the torque converter lockup clutch WK, and a piston chamber for actuating the separating clutch K0. The hydraulic system HY is configured for controlling, by way of an open-loop system, the supply of hydraulic fluid to the components associated with the hydraulic system HY. Associated with the transmission G is a control unit 5 which has a communication link at least to the transmission G, the electric machine EM, and the hydraulic system HY.

When a motor vehicle including a drive train according to FIG. 1 is to be started, the control unit 5 will select between a first operating strategy and a second operating strategy for controlling the torque converter lockup clutch WK. In the first operating strategy, the starting component 3A is locked up by way of the complete engagement of the torque converter lockup clutch WK, if such a condition does not already exist. In the second operating strategy, the torque converter lockup clutch WK is not completely engaged, and so a slip state can occur between the input side 3A_an and the output side 3A_ab of the starting component 3A.

Figure 2:
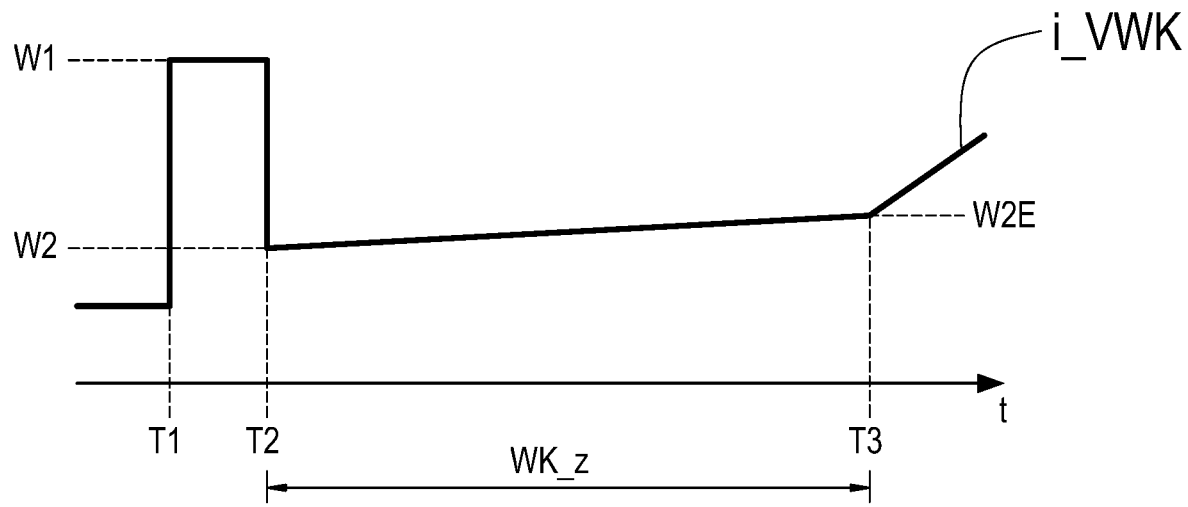
FIG. 2 shows a first time sequence of the control of a torque converter lockup clutch of the torque converter.

FIG. 2 shows a time sequence of the control of the torque converter lockup clutch WK according to the second operating strategy. Specifically, the time sequence of an actuating current i_VWK of a hydraulic valve of the hydraulic system HY is represented, which directly or indirectly controls, by way of an open-loop system, the afflux or supply of hydraulic fluid to a piston chamber of the hydraulic actuation of the torque converter lockup clutch WK. The greater the actuating current i_VWK, the greater is the pressure supplied to the piston chamber for engaging the torque converter lockup clutch WK. At a point in time T1, the actuating current i_VWK is raised to a value w1 and is held constant at this value w1 until a point in time T2. The pre-filling phase of the torque converter lockup clutch WK takes place between the points in time T1 and T2. At the point in time T2, the actuating current is reduced to a value w2 and is increased in a linear manner to a value w2E up to a point in time T3. The filling equalization phase takes place between the points in time T2 and T3. The interval between the points in time T2 and T3 is referred to as the filling equalization time WK_z. An increase in the actuating current i_VWK following the point in time T3 results in an increase in the torque transmission of the torque converter lockup clutch WK.

Figure 3:
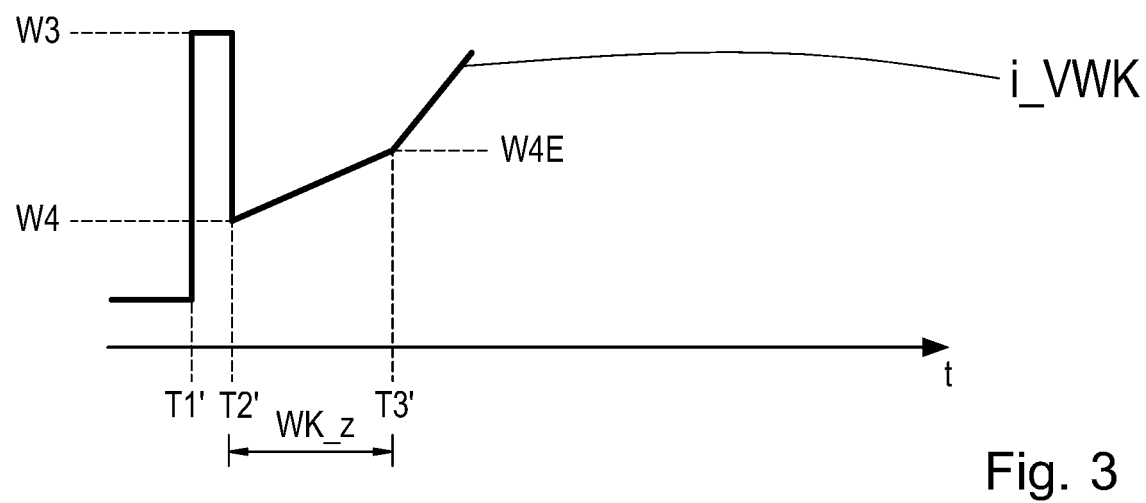
FIG. 3 shows a second time sequence of the control of the torque converter lockup clutch.

FIG. 3 shows a time sequence of the control of the torque converter lockup clutch WK according to the first operating strategy. At the point time T1', the actuating current i_VWK is increased to a value w3 which is higher than the value w1. Therefore, the filling of the torque converter lockup clutch WK takes place with a higher pressure than is the case with the sequence according to the second operating strategy. As a result, in a sequence according to the first operating strategy, there is a higher hydraulic pressure gradient for filling the torque converter lockup clutch WK than is the case in a sequence according to the second operating strategy. Due to the filling now taking place more rapidly, the interval between the point in time T1' and a point in time T2' is reduced. At the point in time T2', the actuating current i_VWK is reduced to a value w4 and is increased in a linear manner up to a value w4E up to a point in time T3'. The filling equalization time WK_z, i.e., the interval between the points in time T2' and T3', is shorter in the sequence according to the first operating strategy than in the sequence according to the second operating strategy. An increase in the actuating current i_VWK following the point in time T3' results in an increase in the torque transmission of the torque converter lockup clutch WK.

Modifications and variations can be made to the embodiments illustrated or described herein without departing from the scope and spirit of the invention as set forth in the appended claims.

REFERENCE CHARACTERS

G transmission
GW1 input shaft
GW2 output shaft
VM internal combustion engine
EM electric machine
K0 separating clutch
AG differential gear
DW driving wheel
3A starting component
WK torque converter lockup clutch
3A_an input side
3A_ab output side
5 control unit
HY hydraulic system
i_VWK actuating current
T1, T1' point in time
T2, T2' point in time
T3, T3' point in time
WK_z filling equalization time
w1 value
w2 value
w2e value
w3 value
w4 value
w4e value

The invention claimed is:

1. A method for operating a drive train of a motor vehicle with at least one electric machine (EM), a transmission (G) for providing different gears between an input shaft (GW1) and an output shaft (GW2) of the transmission (G), and a hydrodynamic torque converter (3A) in the power flow between the electric machine (EM) and the output shaft (GW2), the torque converter (3A) configured to be locked up by engaging a hydraulically actuatable torque converter lockup clutch (WK), the method comprising:
for a starting process of the motor vehicle from a standstill, selecting between a first operating strategy and a second operating strategy for controlling the torque converter lockup clutch (WK);
when the first operating strategy is selected, completely engaging the torque converter lockup clutch (WK), provided that the torque converter lockup clutch (WK) has not already been completely engaged, such that the torque converter (3A) does not assume a slip state during the starting process; and
when the second operating strategy is selected, not completely engaging the torque converter lockup clutch (WK) such that the torque converter (3A) assumes a slip state during the starting process,
wherein a hydraulic pressure gradient for filling a piston chamber of the torque converter lockup clutch (WK) in the first operating strategy is greater than the hydraulic pressure gradient for filling the piston chamber of the torque converter lockup clutch (WK) in the second operating strategy.

2. The method as claimed in claim 1, wherein the drive train of a motor vehicle includes a hydraulic system (HY) configured for open-loop controlling a hydraulic fluid supply to the piston chamber of the torque converter lockup clutch (WK), the method further comprising increasing a system pressure of the hydraulic system (HY) when the first operating strategy is selected.

3. The method of claim 2, wherein the system pressure of the hydraulic system (HY) is increased to a maximum possible value when the first operating strategy is selected.

4. The method of claim 1, wherein a filling equalization time (WK_z) for filling the piston chamber of the torque converter lockup clutch (WK) in the first operating strategy is less than the filling equalization time (WK_z) for filling the piston chamber of the torque converter lockup clutch (WK) in the second operating strategy.

5. A drive train module of a motor vehicle, comprising at least one electric machine (EM), an interface to an internal combustion engine (VM) of the motor vehicle, a control unit (5), a transmission (G) for providing different transmission ratios between an input shaft (GW1) and an output shaft (GW2) of the transmission (G), and a hydrodynamic torque converter (3A) in the power flow between the electric machine (EM) and the output shaft (GW2), wherein the control unit (5), by way of an open-loop control system, is configured to:
for a starting process of the motor vehicle from a standstill, select between a first operating strategy and a second operating strategy for controlling the torque converter lockup clutch (WK);
when the first operating strategy is selected, completely engage the torque converter lockup clutch (WK), provided that the torque converter lockup clutch (WK) has not already been completely engaged, such that the torque converter (3A) does not assume a slip state during the starting process; and
when the second operating strategy is selected, not completely engage the torque converter lockup clutch (WK) such that the torque converter (3A) assumes a slip state during the starting process,
wherein a hydraulic pressure gradient for filling a piston chamber of the torque converter lockup clutch (WK) in the first operating strategy is greater than the hydraulic pressure gradient for filling the piston chamber of the torque converter lockup clutch (WK) in the second operating strategy.

* * * * *